United States Patent [19]

Spinelli

[11] Patent Number: 4,695,607

[45] Date of Patent: Sep. 22, 1987

[54] GROUP TRANSFER PROCESSES FOR ACRYLIC STAR POLYMERS

[75] Inventor: Harry J. Spinelli, Wilmington, Del.

[73] Assignee: E. I. Du Pont De Nemours and Company, Wilmington, Del.

[21] Appl. No.: 771,684

[22] Filed: Sep. 3, 1985

Related U.S. Application Data

[63] Continuation-in-part of Ser. No. 627,919, Jul. 5, 1984, abandoned.

[51] Int. Cl.⁴ .................. C08F 293/00; C08F 295/00; C08F 297/00
[52] U.S. Cl. .................................. 525/272; 525/293; 525/294; 525/296; 525/302; 525/304; 525/308; 525/313
[58] Field of Search ............... 525/272, 293, 294, 302, 525/304, 313, 296, 308

[56] References Cited

U.S. PATENT DOCUMENTS

| | | | |
|---|---|---|---|
| 3,975,339 | 8/1976 | Burchard et al. | 525/271 |
| 4,077,893 | 3/1978 | Kiovsky | 525/192 |
| 4,185,042 | 1/1980 | Verkouw | 525/342 |
| 4,304,881 | 12/1981 | Aoki et al. | 525/67 |
| 4,351,924 | 9/1982 | Andrew et al. | 525/369 |
| 4,414,372 | 11/1983 | Farnham et al. | 526/262 |
| 4,417,029 | 12/1983 | Milkovich | 525/314 |
| 4,417,034 | 11/1983 | Webster | 526/190 |
| 4,508,880 | 4/1985 | Webster | 526/190 |
| 4,524,196 | 6/1985 | Farnham et al. | 526/190 |

OTHER PUBLICATIONS

Eschway et al., "Die Makromolekulare Chemie", vol. 173, pp. 235–139 (1973).
Eschway et al., "Polymer,", vol. 16, pp. 180–184 (Mar. 1975).

*Primary Examiner*—Jacob Ziegler
*Attorney, Agent, or Firm*—Richard H. Burgess

[57] ABSTRACT

Large acrylic star polymers, are made by group transfer polymerization techniques by arm-first, core-first, or arm-core-arm approaches.

4 Claims, No Drawings

GROUP TRANSFER PROCESSES FOR ACRYLIC STAR POLYMERS

CROSS-REFERENCE TO RELATED APPLICATION

This is a continuation-in part of U.S. application Ser. No. 627,919, filed Jul. 5, 1984, abandoned.

BACKGROUND

1. Preparation of Hydrocarbon Star Polymers

Star polymers derived from unsaturated hydrocarbon monomers, such as styrene, butadiene and isoprene, have been obtained by preparing lithium-terminated "living" polymers via anionic polymerization and then coupling the "living" polymer chains by reacting them with various polyfunctional linking agents. This has usually produced hydrocarbon star polymers with relatively few (3–12) arms. Hydrocarbon star polymers with a larger number of arms (e.g., 15–56) have been obtained by sequential anionic polymerization of difunctional monomers (e.g., divinylbenzene) with monofunctional monomers (e.g., styrene) or with monomers that behave as monofunctional monomers (e.g., isoprene). Both methods of preparing hydrocarbon star polymers have benn reviewed by B. J. Bauer and L. J. Fetters in *Rubber Chem.* and *Technol.* (Rubber Reviews for 1978). Vol. 51, No. 3, pp 406–436 (1978).

A Aoki et al., U.S. Pat. No. 4,304,881 (1981), prepared styrene/butadiene "living" polymers by anionic polymerization and then coupled them by reaction with silicon tetrachloride to poduce a 4-arm star polymer having a silicon core in Example 4.

H. T. Verkouw, U.S. Pat. No. 4,185,042 (1980), prepared a polybutadiene "living" polymer by anionic polymerization and then prepared a silcon-containing 3-arm star by reacting the "living" polymer with γ-glycidoxypropyltrimethoxysilane in Example 5.

R. Milkovich, U.S. Pat. No. 4,417,029 (1983), prepared a hydrocarbon star polymer having 10 arms of 2 kinds. Of the 10 arms, 5 were a diblock copolymer of polystyrene ($Mn=12,300$) and polyisoprene ($Mn=52,450$). The other 5 arms were polyisoprene ($Mn=52,450$). The hydrocarbon star polymer was prepared by charging sec-butyllithium, then isoprene, them more see butyllithium, then isoprene, then divinylbenzene at a mole ratio of divinylbenzene to sec-butyllithium initiator of 5.5:1. Subsequent reaction of the "living" lithium sites in the core with carbon dioxide or ethylene oxide produced carboxylic acid or hydroxyl groups respectively in the core in Example 2.

T. E. Kiovsky, U.S. Pat. No. 4,077,893 (1978), suggested reacting lithium-terminated "living" polymers derived from diene monomers (e.g., butadiene or isoprene) with divinylbenzene to form a 4–25 arm star polymer and then reacting the (still living) star polymer with the same or a different monomer to grow further polymer chains from the core. Thus, star polymers having two kinds of arms were proposed in Col. 5, lines 40–58.

W. Burchard and H. Eschway, U.S. Pat. No. 3,975,339 (1976), reacted a mixture of 50% divinyl-benzene and 50% ethylivinylbenzene in toluene with n-butyllithium to produce a polydivinylbenzene microgel having 270 active lithium-carbon bonds per molecule. This was subsequently reacted with styrene to produce a star polymer having 270 arms, each arm having a weight average molecular weight of 17,500 in Example 1.

H. Eschway, M. L. Hallensleben and W. Burchard, *Die Makromolekulare Chemie,* Vol. 173, pp 235–239 (1973), describe the anionic olymerization of divinylbenzene using butyllithium to produce soluble "living" microgels of high molecular weight. These microgels were then used to initiated polymerization of other monomers to produce star polymers. The nember of arms depended on the number of active sites in the "living" microgel, which in turn depended on the mole ratio of divinylbenzene to butyllithium initiator. To avoid gellation it was necessary to work at low concentrations (e.g., 2.5% in benzene).

H. Eschway and W. Burchard, *Polymer,* Vol. 16, pp 180–184 (March, 1975), prepared a star polymer having 67 polystyrene arms and 67 polyisoprene arms by sequential anionic polymerization of styrene, divinylbenzene and isoprene. Low concentrations of monomer were used to avoid gellation.

2. Preparation of Acrylic Star Polymers

In contrast to hydrocarbon star polymers (which may be prepared having different arm sizes, different numbers of arms and even with two different kinds of arm attached to the same core), acrylic star polymers have been available only in a limited variety of structures.

G. W. Andrews and W. H. Sharkey, U.S. Pat. No. 4,351,924 (1982), prepared acrylic star polymers having 3 or 4 hydroxyl-terminated arms by coupling acetal-ended, "living" poly(methyl metharylate) with 1,3,3-tris (bromomethyl) benzene of 1,2,4,5-tetrabis (bromomethyl) benzene.

O. W. Webster, U.S. Pat. Nos. 4,417,034 (Nov. 22, 1983) and 4,508,880 (Apr. 2, 1985), and W. B. Farnham and D. Y. Sogah, U.S. Pat. Nos. 4,414,372 (Nov. 8, 1983) and 4,524,196 (June 18, 1985) showed that acrylic star polymers can be prepared via group transfer polymerization by coupling "living" polmer with a capping agent having more than one reactive site or by initiating polymerization with an initiator which can initiate more than one polymer chain. Initiators that could produce acrylic star polymers with up to 4 arms were demonstrated.

R. J. A. Eckert, U.S. Pat. No. 4,116,917 (1978), describing hydrocarbon star polymers suggested that small amounts of other monomers (e.g., methyl methacrylate) may be included (Col. 3, lines 22–28) and that ethylene dimethacrylate may be used as a coupling agent (Col. 5, lines 22–28). A similar suggestion is made by T. E. Kiovsky, U.S. Pat. No. 4,077,893, cited above.

J. G. Zilliox, P. Rempp and J. Parrod, *J. Polymer Sci., Part C,* Polymer Symposia No. 22, pp 145–156 (1968), describe the preparation, via anionic polymerization, of a mixture of star polymers having 3 to 26 polymethyl methacrylate arms attached to cores of ethylene glycol dimethacrylate. The mixture also contained linear polymethyl methacrylate. The article says the lengths of the individual branches were constant by that the number of branches per star "fluctuates considerably", giving rise to a very high polydispersity.

3. Uses of Star Polymers

Hydrocarbon star polymers have been used as additives to improve the impact strength of polyphenylene ether resins—W. R. Haaf et al., U.S. Pat. No. 4,373,055 (1983); dry nylon—W. P. Gergen et al. U.S. Pat. No. 4,242,470 (1980); rubber-modified polystyrene—A.

Aoki et al, U.S. Pat. No. 4,304,881, cited above; and chlorinated polyvinyl chloride resins M. H. Lehr, U. S. Pat. No. 4,181,644 (1980).

Hydrocarbon star polymers have also been added to asphaltic concrete to improve the service life—C. R. Bresson, U.S. Pat. No. 4,217,259 (1980); to polyether-ester resins to provide a desirable overall balance of properties-R. W. Seymoure, U.S. Pat. No. 4,001,286 (1977), and to lubricating oil to improve the viscosity index and act as a dispersant—T. E. Kiovsky, U. S. Pat. No. 4,077,893 (1978).

Hydrocarbon star polymers have also been used to prepare thermoplastics having good clarity by blending them with thermoplastic resins such as methyl methacrylate/styrene/butadiene copolymers, polyester urethanes, epoxides, acrylics, polycarbonates, polyesters, etc.,—E. L. Hillier, U.S. Pat. No. 4,048,254 (1977).

Acrylic star polymers, because of the limited selection heretofore obtainable, have not been put to as great a variety of uses.

SUMMARY OF THE INVENTION

Group transfer polymerization processes are provided for preparing acrylic star polymers which comprise.

a. a crosslinked core comprising a polymer derived from a mixture comprising
  i. 1–100% by weight of a monomer having at least two carbon-carbon double bonds polymerizable by a group transfer polymerization process and optionally
  ii. 0–99% by weight of a monomer having one carbon-carbon double bond polymerizable by a group transfer polymerization process,
b. attached to the core, at least 5 arms comprising polymer chains derived from one or more monomers polymerizable by a group transfer process, and
C. attached to the core or to at least some of the arms, "living" group transfer polymerization sites.

These processes comprise: an arm/core process comprising
a. preparing a "living" polymer by reacting a group transfer initiator with one or more monomers having a carbon-carbon double bond polymerizable by a group transfer polymerization process;
b. attached to the core, at least 5 arms comprising polymer chains derived from one or more monomers polymerizable by a group transfer process, and, a core/arm process comprising
a. preparing a "living" core by reacting a group transfer initiator with a mixture comprising
  i. 1–100% by weight of a monomer having at least two carbon-carbon double bonds polymerizable by a group transfer polymerization process and optionally,
  ii. 0–99% by weight of a monomer having one carbon-carbon double bond polymerizable by a group transfer polymerization process;
b. contacting the resulting "living" core with one or more monomers having one carbon-carbon double bond polymerizable by a group transfer polymerization process.

and an arm/core/arm process comprising
a. preparing a "living" polymer by reacting a group transfer initiator with one or more monomers (A) having a carbon-carbon double bond polymerizable by a group transfer polymerization process;
b. contacting the resulting "living" polymer with a mixture (B) comprising
  i. 1–100% by weight of a monomer having at least two carbon-carbon double bonds polymerizable by a group transfer polymerization process and optionally
  ii. 0–99% by weight of a monomer having one carbon-carbon double bond polymerizable by a group transfer polymerization process to produce a "living" star polymer having "living" group transfer polymerization sites in the core and,
c. contacting the resulting "living" star polymer with one or more monomers (C) having one carbon-carbon double bond polymerizable by a group transfer polymerization process, where the monomers (C) can be the same as or different from the monomers (A).

By these processes, acrylic star polymers can be provided which comprise
a. a core comprising a polymer derived from a mixture comprising
  i. 1–100% by weight of one or more monomers, each having at least two groups,

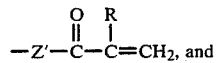

ii. 0–99% by weight of one or more monomers, each having one group,

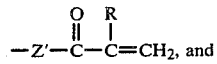

b. attached to the core, at least 5 arms comprising polymer chains derived from one or more monomers, each having one group,

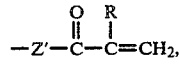

in each of which R is the same or different and is H; $CH_3$, $CH_3CH_2$, CN or $CO_2R'$ and Z' is O or NR', wherin R' is $C_{1-4}$ alkyl.

wherein: at least 50% of the molecules of such star polymer have from at least 5 to 2,000,000 arms. preferably at least 50, more preferably at least 100 arms. In a preferred embodiment, such arms are of 1 or more sets of different types, wherein:
  i. the polymer chains comprising one of the types of arms have the same or different molecular weight and are derived from the same or different monomers as the polymer chains comprising the other said type of arms,
  ii. the polymer chains comprising each type of arms have an arm polydispersity of 1.0 to 2.0 where said arm polydispersity is the weight average molecular weight divided by the number averager molecular weight of the polymer chains of that type,.and
said star polymers, comprising both core arm of 1 or more types, have a molecular polydispersity of 1.0 to 2.0, wherein said molecular polydispersity is the weight average molecular weight divided by the number average molecular weight of the molecules.

This can be described as a bimodal or polymodal narrow polydisperisty, wherein each of the star polymer itself and the arms or separate sets of arms have narrow polydispersities.

Also, preferably the star polymer of this invention is a soluble acrylic star polymer comprising (A) a crosslinked core comprising a polymer derived from a mixture comprising (i) 1–100% by weight of one or more monomers, each having at least two groups,

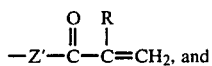

(ii) 0–99% by weight of one or more monomers, each having one group

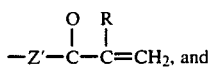

b. attached to the core, at least 5 arms comprising polymer chains derived from one or more monomers, each having one group,

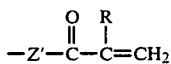

in each of which R is the same or different and is H, $CH_3$, $CH_3CH_2$, CN or $CO_2R'$ and $Z'$ is O or $NR'$, wherein $R'$ is $C_{1-4}$ alkyl, wherein: at least 50% of the molecules of such star polymers have a least from 5 to 2,000,000 arms. wherein the ratio of the number of arms to the number of difunctional acrylic repeat units in the core is less than or equal to 1:1.

Such star polymers are made using a polymerization initiator in a molar ratio of initiator to difunctional acrylic monomer of less than or equal to 1:1, giving a crosslinked core and not gelling the reaction mixture. By "soluble" is meant that nothing separates out from a solution of 1% by weght stars in 99% solvent (toluene, glyme and/or THF) upon centrifuging at 17,00 rpm for 30 minutes. Preferably the arms solubilize the core.

Such star polymers of a variety of types are provided that have useful properties for applications in coatings, films, fibers and plastics. The star polymers comprise (1) a core derived from a multifunctional monomer having at least two polymerizable double bonds, (2) at least 5 polymeric arms attached to the core and preferably (3) "living" group transfer sites on the core and/or on the arms.

Such "living" star polymers comprise a. a crosslinked core comprising a polymer derived from a mixture comprising i. 1–100% by weight of a monomer having at least two carbon-carbon double bonds polymerizable by a group transfer polymerization process and optionally 0–99% by weight of monomer having one carbon-carbon double bond polymerizable by a group transfer polymerization process, b. attached to the core, at least 5 arms comprising polymer chains derived from one or more monomers polymerizable by a group transfer process, and, attached to the core or to at least some of the arms, "living" group transfer polymerization sites.

Preferably, in star polymers of the invention, the monomers having one carbon-carbon double bond polymerizable by a group transfer polymerization process are selected from

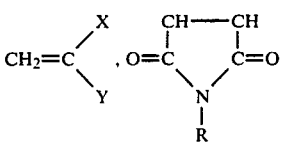

and mixtures thereof wherein:

X is —CN, —CH=CHC(O)X' or —C(O)X':

Y is —H, —$CH_3$, —CN or —$CO_2R$, provided, however, when X is —CH=CHC(O)X', Y is —H or —$CH_3$;

X' is —OSi($R^1$)$_3$, —R, —OR or —NR'R"; each $R^1$ is independently selected from $C_{1-10}$ alkyl and $C_{6-10}$ aryl or alkaryl;

R is $C_{1-20}$ alkyl, alkenyl, or alkadienyl; $C_{6-20}$ cycloalkyl, aryl, alkaryl or aralkyl; any of said groups containing one or more ether oxygen atoms within alophatic segments thereof; and any of all the aforesaid groups containing one or more functional substituents that are unreactive under polymerizing conditions; and each of R' and R" is independently selected from $C_{1-4}$ alkyl More preferably, "living" acrylic star polymers of the invention comprise a. a core comprising a polymer derived from a monomer mixture comprising 1–100% by weight of a monomer having at least two carbon-carbon double bonds polymerizable by an initiator, Q-Z, and optionally ii. 0–99% by weight of a monomer having one carbon-carbon double bond polymerizable by an initiator, Q-Z, and b. attached to the core, at least 5 arms comprising polymer chains derived from one or more monomers polymerizable by an initiator, Q-Z, and c. attched to the core and/or to at least some of the arms the groups Q-Z"-.

where the group Q- is the initiating moiety in a "living" group transfer polymerization initator, Q-Z, and where the group Z"- is derived from an activating substituent, Z, of a group transfer polymerization initiator, Q-Z, and where the initiator, Q-Z, is capable of reacting with a monomer having carbon-carbon double bonds to form A "living" polymer chain having the group, Z"-, attached to one end of the "living" polymer chain and the group, Q-, attached to the other, "living", end of the "living" polymer chain and where, the "living" polymer chain is capable of initiating polymerization of additional monomer, which can be the same or different from the monomer used to prepare the "living" polymer chain, to produce a larger "living" polymer chain having a group, Z"-, attached to one end of the "living" polymers chain and the group, Q-, attached to the other "living" end of the "living" polymer chain, and where the group, Z"-, is the same as or an isomer of the group, Z-.

Also preferably in the preparation of star polymers of the invention, the "living" group transfer polymerization sites are $(R^1)_3M-$ wherein: $R^1$ is selected from $C_{1-10}$ alkyl and $C_{6-10}$ aryl or alkaryl; and M is Si, Sn, or Ge.

Still more preferably, in polymer of the invention, the group, Q-, is $(R^1)_3M-$ as defined above.

In such polymers, the group, Z-, is selected from

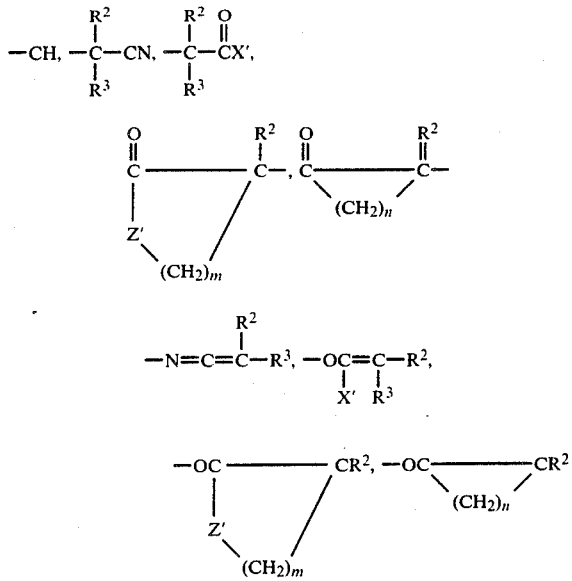

and mixtures thereof wherein:

X' is $OSi(R^1)_3$, —R, —OR or —NR'R"; each $R^1$ is independently selected from $C_{1-10}$ alkyl and $C_{6-10}$ aryl or aralkyl;

R is $C_{1-20}$ alkyl, alkenyl, or alkadienyl; $C_{6-20}$ cycloalkyl, aryl, alkarl or aralkyl; any of said groups containing one or more ether oxygen atoms within aliphatic segments thereof; and any of all the aforesaid groups containing one or more functional substituents that are unreactive under polymerizing conditions; and each of R' and R" is independently selected from $C_{1-4}$ alkyl each of $R^2$ and $R^3$ is independently selected from H; $C_{1-10}$ alkyl and alkenyl; $C_{6-10}$ aryl, alkaryl, and aralkyl; any of said groups except H containing one or more ether oxygen atoms within aliphatic segments thereof; and any of all the aforesaid groups except H containing one or more Functional substituents that are unreactive under polymerizing conditions; and Z' is O or NR';

m is 2, 3 or 4;

n is 3, 4 or 5.

DETAILED DESCRIPTION OF THE INVENTION

In the preparation of the star polymers, use is made of "group transfer" polymerization. By "group transfer" polymerization, is meant a polymerization process in which polymerization of monomers having carbon-carbon double bonds is initiated by certain initiators of the formula Q-Z where Z is an activating substituent that becomes attached to one end of the growing polymer molecule and where Q is a group that continuously transfers to the other end of the growing polymer molecule as monomer is added to the growing polymer molecule. Thus, polymerization of the monomer,

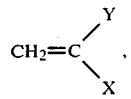

initiated by a group transfer initiator, Q-Z, proceeds as follows:

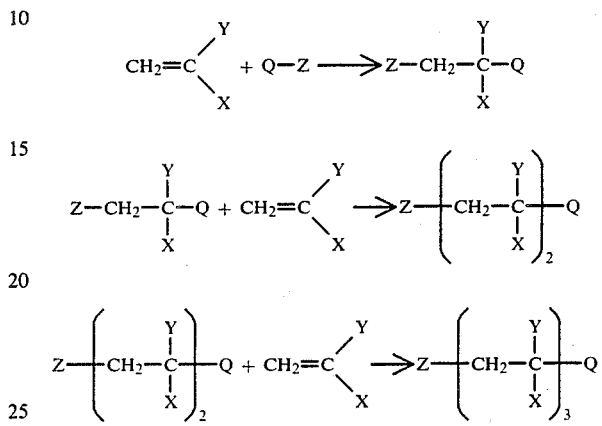

The group, Q, is thus an active site that can initiate further polymerization of more monomer. The polymer molecule having the group, Q, is referred to as a "living" polymer and the group, Q, is referred to as a "living" group transfer initiating site.

The word "living" is used sometimes herein in quotation marks to indicate its special meaning and to distinguish it from substances which are alive in a biological sense.

More particularly, in the preparation of the star polymers, use is made of the "group transfer" polymerization process of the gerneral type described in part by W. B. Farnham and D. Y. Sogah, U.S. Pat. No. 4,414,372 and by O. W. Webster, U.S. Pat. No. 4,417,034, and in continuation-in-part U.S. Pat. Nos. 4,508,880 Webster, granted Apr. 2, 1985, and 4,524,196 Farnham and Sogah, granted June 18, 1985, the disclosures of all of which are incorporated herein by reference. Group transfer polymerization produces a "living polymer" when an initiator of the formula $(R^1)_3MZ$ is used to initiate polymerization of a monomer having a carbon-carbon double bond.

In the initiator, $(R^1)_3MZ$ the Z group is an activating substituent that becomes attached to one end of the "living" polymer molecule. The $(R^1)_3M$ group becomes attached to the other ("living") end of the "living" polymer molecule. The resulting "living" polymer molecule can then itself act as an initiator for polymerization of the same or a different monomer to produce a new "living" polymer molecule having the Z activating substituent at one end and the $(R^1)_3M$ group at the other ("living") end. The "living" polymer may then be deactivated, if desired, by contacting it with an active proton source such as an alcohol. At this point, it might be useful to consider a specific example—the group transfer polymerization of specific monomer (in this case, methyl methacrylate) using a specific group transfer initiator (in this case 1-trimethylsiloxy-1-isobutoxy-2-methylpropene). The reaction of 1 mole of initiator with n moles of monomer produces "living" polymer as follows:

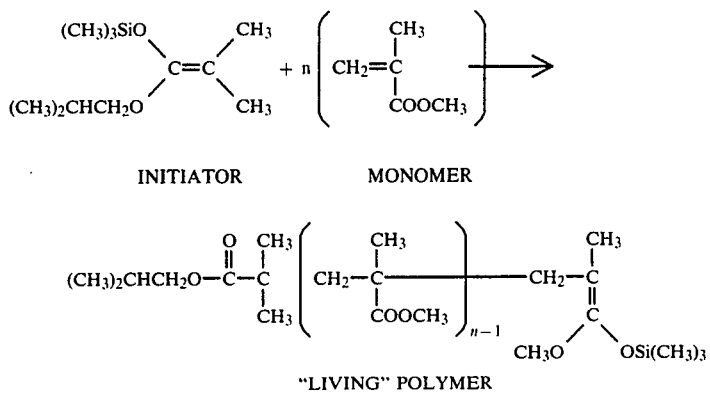

INITIATOR     MONOMER

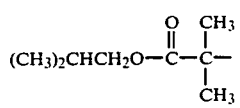

"LIVING" POLYMER

The

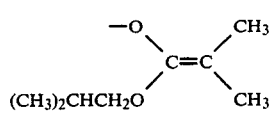

group shown on the left side of the "living" polymer molecule is derived from the activating group, z, which, in the initiator, was in the form $$\underset{(CH_3)_2CHCH_2O}{-O}\diagdown C=C \diagup^{CH_3}_{CH_3}$$

The —Si(CH$_3$)$_3$ group on the right side ("living" end) of the "living" polymer molecule is the (R$^1$)$_3$M group. The "living" polymer molecule can act as an initiator to initiate polymerization of the same or a different monomer. Thus, if the above "living" polymer is contacted with m moles of butyl methacrylate in the presence of active catalyst, the following "living" polymer is obtained:

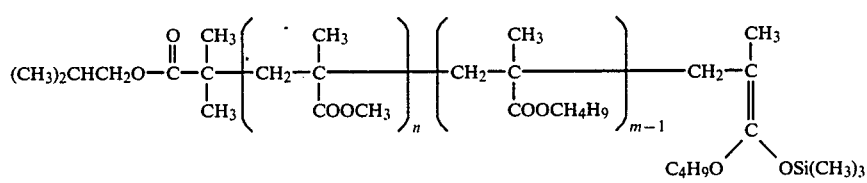

If the resulting "living" polymer is then contacted with methanol, the following deactivated polymer is obtained.

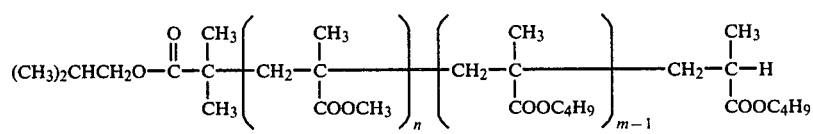

The star polymers of the invention are prepared by three different methods, each making use of the group transfer process described above.

(1) Arm-First Method

In this method, a "living" polymer (the arm) is prepared by contacting a monomer (A) having a carbon-carbon double bond with a group transfer initiator, (R$^1$)$_3$MZ. The resulting "living" polymer is then contacted with a multifunctional linking agent (monomer B) having at least two polymerizable double bonds per molecule of linking agent. This produces a star polymer having arms of polymerized monomer A attached to a crosslinked core of polymerized monomer B. The active group transfer sites in the core can be deactivated by reaction with a proton source.

(2) Core-First Method

In this method, a "living" core is prepared by contacting a group transfer initiator, (R$^1$)$_3$MZ, with a multifunctional linking agent (monomer B) having at least two polymerizable double bonds per molecule of linking agent. The resulting "living" core is then contacted with a monomer (A) to produce a star polymer having arms of polymerized monomer A attached to a crosslinked core of polymerized monomer B. The active group transfer sites at the ends of the arms can be reacted with a further monomer or deactivated by reaction with a proton source.

(3) Arm-Core-Arm method

In this method, a "living" polymer (the first arm) is prepared by contacting a monomer (A) having a carbon-carbon double bond with a group transfer initiator, (R$^1$)$_3$MZ. The resulting "living" polymer is then contacted with a multifunctional linking agent (monomer B) having at least two polymerizable double bonds per molecule of linking agent. This produces a star polymer having arms of polymerized monomer A attached to a crosslinked core of polymerized monomer B and having "living" group transfer sites in the core. This is then contacted with a third monomer C to grow arms out from the core. The monomers A and C can be the same or different and the number of moles of A and C can be the same or different. Thus, if desired, the two types of arms can have different molecular weights and/or be derived from different monomers. Using two or more types of "living" sites in the core, with differently reactible functional groups on the arms, more than two different types of arms can result.

The multifunctional linking agent referred to above can be any molecule having at least two plymerizable carbon-carbon double bonds. Examples of suitable linking agents are:

ethylene dimethacrylate
1,3-butylene dimethacrylate
tetraethylene glycol dimethacrylate
triethylene glycol dimethacrylate
trimethylolpropane trimethacrylate
1,6-hexylene dimethacrylate
1,4-butylene dimethacrylate
ethylene diacrylate
1,3-butylene diacrlate
tetraethylene glycol diacrylate
triethylene glycol diacrylate
trimethylolpropane triacrylate
1,6-hexylene diacrylate
1,4-butylene diacrylate other useful ingredients and techniques will be found in the herein incorporated above-mentioned U.S. Patents, especially U.S. Pat. No. 4,417,034—Webster, in columns 1–9.

INTRODUCTION TO EXAMPLES

The ingredients and procedures used in the examples are outlined below to aid in understanding the invention.

I. Starting Materials

A. Initiators

Isobutyl Initiator 1-trimethylsiloxy-1-isobutoxy-2-methylpropene

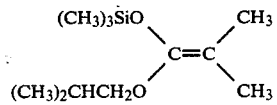

Molecular Weight: 216.39

OH-Blocked Initiator 1-(2-trimethylsiloxyethoxy)-1-trimethylsiloxy-2-methylpropene

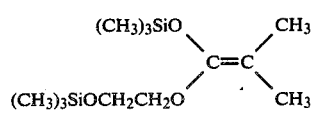

Molecular weight: 276.52

B. Catalysts

TASHF₂

Tris(dimethylamino)sulfonium bifluoride

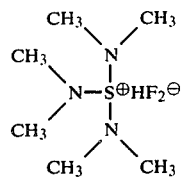

TBAHF₂

Tetrabutylammonium bifluoride
$(C_4H_9)_4N^\oplus HF_2^\ominus$

TBACF

Tetrabuytlammonium chlorobenzoate

C. Solvents

Glyme 1,2-dimethoxyethane
$CH_3OCH_2CH_2OCH_3$

Others

Acetonitrile=$CH_3CN$
Xylene
THF=Tetrahydrofuran=

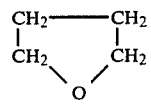

D. Monomers

MMA methy methacrylate

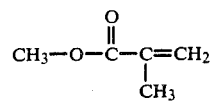

M.W.=100.12

2EHMA 2-ethylhexyl methacrylate

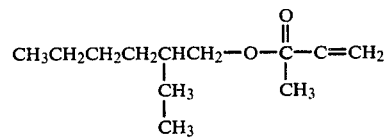

M.W.=198.29

IEM 2-isocyanatoethyl methacrylate

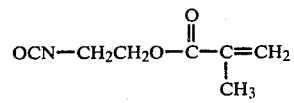

M.W.=155.14

AMA allyl methacrylate

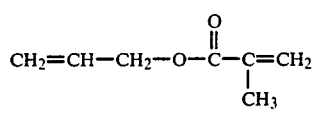

M.W.=126.14

EGDMA ethylene glycol dimethacrylate

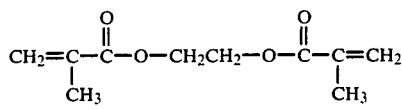

M.W.=198.20

TEGDMA tetraethylene glycol dimethacrylate

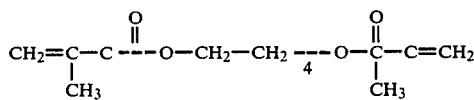

M.W.=330.34

II. Reactions

A. Polymerization of MMA with "Isobutyl Initiator"

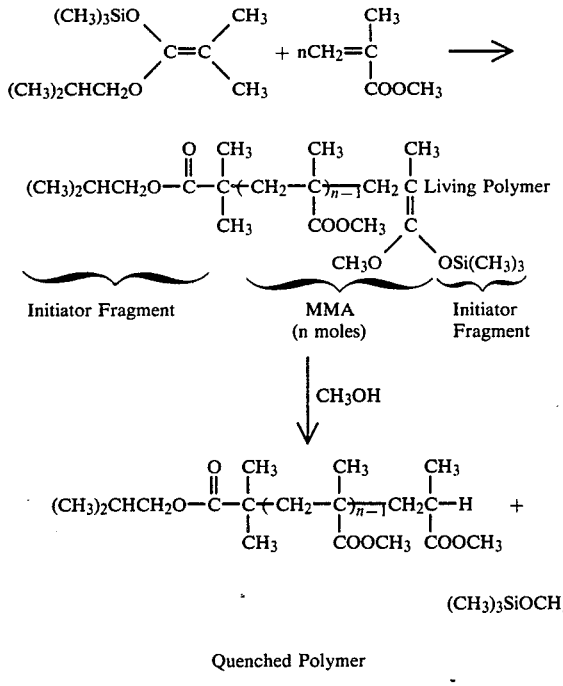

B. Polymerization of MMA with "OH-Blocked Initiator"

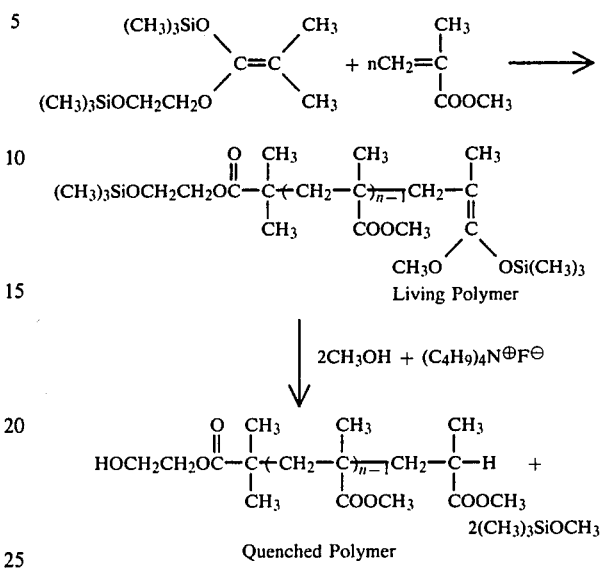

C. Preparation of Star Polymers

Let "IS" represent the initiator, where "I" is the part that remains at the beginning of the polymer chain (i.e.,

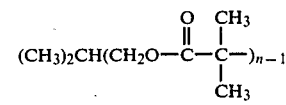

and where "S" represents the part of the initiator that goes to the other ("living") end of the polymer chain and is eventually removed by reaction with methanol.

Let "M" represent a mono-methacrylate (e.g., MMA).

Let

represent a dimethacrylate (e.g., (EGDMA) 1. Preparation by "Arm First" Method a. Polymerize "M"

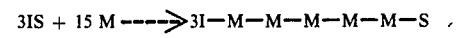

$3IS + 15 M \longrightarrow 3I-M-M-M-M-M-S$ b. Add "M~M"

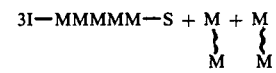

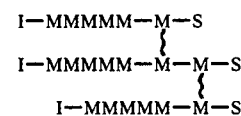

c. Add Methanol to Remove "S"

Final polymer is:

```
         I—MMMMM—M
                 }
         I—MMMMM—M—M
                    }
         I—MMMMM—M
```

This star has 3 arms, each arm having been made from 5 monomer molecules.

Calculation

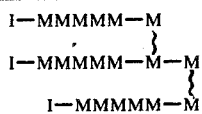

where
(IS) = moles of initiator
(M-M) = moles of dimethacrylate
in above example, $$\frac{1}{\frac{3}{2}-1} + 1 = 3 \text{ arms for star polymer-molecule}$$

2. Preparation by "Core First" Method

Polymerize "M~~M"     a.

```
3 IS + M   M      I—M—S
       } + }         }
       M   M      I—M—M—S
                     }
                  I— M—S
```

Add "M" and "M~~M"    b.

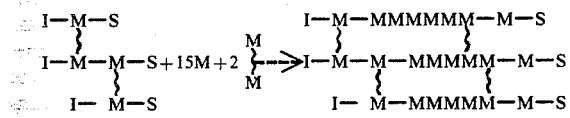

Add Methanol to Remove "S"    c.

Final polymer is:

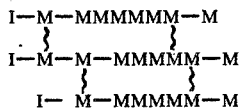

This star has 3 arms, each arm having been made from 5 monomer molecules.

3. Comparison of "Arm First" and "Core First" Method a. Calculation are the same.
b. Structures are similar except for point of attachment of initiator fragment "I".
   (1) in "arm first" method, "I" becomes attached to outside ends of arms.
   (2) in "core first" method, "I" becomes attached to core.

Thus, since "I" can be made to carry a functional group (e.g., an OH group when the OH-blocked initiator is used), it is possible to make stars having functional groups attached to the outside ends of the arms (by the "arm first" method) or attached to the core (by the "core first" method).

4. Preparation of Giant Stars

Note that the size of the arms can be varied by changing the ratio (M)/(IS) (where (M)=moles of monomethacrylate and (IS)=moles of initiator). Long arms are obtained when (M)/(IS) is large.

Note also that the number of arms can be varied by changing the ratio (IS)/(M-M) (where (IS)=moles of initiator and (M-M)=moles of dimethacrylate). A large number of arms results when (IS)/(M-M) is made close to, but greater than 1.00.

Thus, if 1.05 moles of initiator are used with 1.00 moles of dimethacrylate, the resulting star will have 21 arms.

$$\text{Number of arms} = \frac{1}{\frac{(IS)}{(M-M)}-1} + 1 =$$

$$\frac{1}{\frac{1.05}{1.00}-1} + 1 = 21$$

If the ratio (IS)/(M-M) is equal to or less than 1.00, as in a preferred embodiment of the invention, the equation fails and the number of arms cannot be calculated. In this case, (e.g., when (IS)/(M-M)=0.25) a crosslinked core is obtained having a very large number of arms (e.g., 200). Most of the examples show the preparation of these gaint stars.

If a more lightly crosslinked core is desired, monfunctional acrylic can be substituted for difunctional or higher functionality acrylics. The amount of substitution can range from a small but effective amount for for the purpose of decreasing the crosslink density up to 99% by weight monofunctional ingredients, measured on the basis of total acrylics. Such small amounts can be less than 1%, event as little as 0.1 or 0.01%, by weight. Because of the flexibility in designing systems with from much to little crosslinking in the core, when the claims say "crosslinked", they mean more or less crosslinked, depending on the proportion of monofunctional and multifunctional acrylics in the core.

In the examples and elsewhere, parts, percentages and proportions are given by weight except where indicated otherwise.

EXAMPLE 1

This describes the preparation of a poly(methyl methacrylate) star polymer by making the arms polymer first and then connecting the arm together.

The polymer is useful as a rheology control agent in high solids paints of both the unicoat and color coat/clear coat types.

A three-neck round bottom flask fitted with a mechanical stirrer, a reflux condenser, a rubber septum, a temperature probe and provision for maintaining a dry nitrogen atmosphere was used as a. reaction vessel. After purging with dry nitrogen, the flask was charged with the following initial charge:

Initial Charge 1189.0 g glyme
15.54 g xylene
14.0 g 1-trimethylsiloxy-1-isobutoxy-2-methylpropene To the initial charge was then added via syringe the initail catalyst:

Initial Catalyst 100 microliters of a 1.0 molar solution of tetrabutylammonium bifluoride (TBAHF$_2$) in glyme.

The mixture thus obtained was then stirred continuously under dry nitrogen while adding the feed compositions shown below at constant rates via syringe pumps. At the beginning of the first feed, a clock was started and left running to keep track of the feeds and other steps. The feed compositions and the clock times (in minutes) at which the additions of the feed compositions were started and completed were as follows:

| Feed | Feed Composition | Clock Time (Minutes) | |
|---|---|---|---|
| | | Addition Started | Addition Completed |
| I | 300 microliters, 1.0 M TBAHF$_2$ and 5.3 g glyme | 0 | 90 |
| II | 844.4 g methyl methacrylate | 0 | 40 |
| III | 55.8 g ethylene glycol dimethacrylate | 55 | 70 |

During the additions of the feeds, the temperature gradually rose, reaching a maximum of 86° C. at a clock time of 30 minutes.

At a clock time of 55 minutes, before the addition of Feed III was started, a 50 g portion of the reaction mixture (Sample 1) was removed for testing and quenched by the addition of 2 ml methanol.

At a clock time of 100 minutes, the reaction mixture was quenched by the addition of quencher:

Quencher 20 g methanol

The resulting clear solution of star polymer had a solids content of 43.1% (vs 42.45% theoretical).

The arm polymer was present in Sample 1 at a solids content of 37.8% (vs 40.50% theoretical) indicating that about 94% of the methyl methacrylate had polymerized at the time the sample was taken. Analysis by gel permeation chromatography (GPC) showed a number average molecular weight of 11,900 (vs 13,00 theoretical), a weight of average molecular weight of 18,100 and a dispersity 1.52 for the arm polymer Light scattering and viscosity measurements on similar star polymers show molecular weights of about 2.7 million. Thus, the star polymer has on the order of 200 arms, each having a molecular weigh of about 12,000.

EXAMPLE 2

This describes the preparation of a poly(methyl methacrylate) star polymer having arms terminated with hydroxyl groups.

The polymer can be used as a rheology control agent and is especially useful in enamels, where the hydroxyl groups allow the star polymer molecules to become a part of the polymer network making up the crosslinked enamel film. The polymer can also be used as an enamel binder polymer by combining it with a polyisocyanate or a melamine/formaldehyde resin. The polymer can also be used as a precursor for further reactions (e.g., the introduction of methacrylate functionality as described in Example 3).

The reaction vessel described in Example 1 was purged with dry nitrogen and then charged with the following initial charge:

Initial Charge 800.24 g glyme
4.8 g xylene 8.34 g 1- (2- trimethylsiloxyethoxy)-1-trimethylsiloxy-2-methylpropene To the initial charge was then added via syringe the initial catalyst:

Initial Catalyst 50 microliters of a 1.0 molar solution of TBAHF$_2$ in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 300 microliters of 1 M TBAHF$_2$ and 3.0 g glyme | 0 | 80 |
| II | 310.18 g methyl methacrylate | 0 | 30 |
| III | 39.62 g tetraethyleneglycol dimethacrylate | 45 | 60 |

During the additions of the feeds, the temperature gradually rose, reaching a maximum of 62° C. at 40 minutes.

At a clock time of 45 minutes, before the addition of Feed III was started, a 2 g portion of the reaction mixture was (Sample 1) removed for testing and quenched.

At 110 minutes, the reaction was quenched and the hydroxyl groups unblocked by the addition of quencher:

Quencher 30.0 g methanol
3.0 g of a 1 molar solution of a tetrabutylammonium floride in tetrahydrofuran The resulting star polymer was isolated by precipitation in methanol and dried in a vacuum oven. As in Example 1, the star has a large number of arms, but in this case, the arms have a molecular weight of about 10,000 and each arm is terminated by a hydroxyl group. The star polymer has about 0.0852 milliequilvalents OH per gram of solids (or a hydroxyl number of about 4.78 mg KOH/g polymer).

EXAMPLE 3

This describes the preparation of a star polymer having terminal methacrylate groups by reaction of the star polymer of Example 2 with 2-isocyanatoethyl methacrylate.

The polymer is useful as a toughening modifier for plastics such as cast poly(methyl methacrylate) sheet, pigmented, filled such as with hydrated aluminum oxide, or clear. It may also be used in coatings and in photopolymerizable systems.

The dry star polymer of Example 2 (150.00 g, 0.0128 equivalents OH) was dissolved in 300.02 g dry glyme. Then 2.29 g (0.0148 mole ) 2-isocyanatoethyl methacrylate and 2 drops of a 10% solution of dibutyltin dilaurate inmethyl ethyl ketone was added and the mixture stirred. After standing over the weekend, the reaction mixture was found to have lost its IR band at 2356 cm$^{-1}$ (NCO) showing that the reaction was substantially complete.

The resulting star polymer has a large number of poly(methyl methacrylate) arms, each having a molecular weight of about 10,000 and each terminated with a methacrylate group.

EXAMPLE 4

This describes the preparation of a star polymer in which the arms are a block copolymer of methyl methacrylate and 2-ethylhexyl methacrylate. The polymer is prepared by making the core first and then polymerizing the arms onto it.

The polyme can be used as a rheology control agent or toughening agent in coatings or plastics.

A reaction vessel as described in Example 1 was purged with dry nitrogen and then charged with the following initial charge:

Initial Charge 88.14 g glyme
1.16 g 1-trimethylsiloxy-1-isobutoxy-2-methylpropene To the initial charge was then added via syringe the initial catalyst:

Initial Catalyst 50 microliters of a 1.0 molar solution of tris(dimethylamino) sulfonium bifluoride in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) Addition Started | Addition Completed |
|---|---|---|---|
| I | 200 microliters of 1.0 M TASHF$_2$ and 2.0 g acetonitrile | 0 | 80 |
| II | 1.02 g ethylene glycol dimethacrylate | 0 | 10 |
| III | 29.57 methyl methacrylate | 20 | 35 |
| IV | 27.73 g 2-ethylhexyl methacrylate | 45 | 60 |

During the additions of the feeds, the temperature gradually rose, reaching a maximum of 48° C. at 45 minutes.

At a clock time of 90 minutes, the reaction was quenched by the addition of quencher:

Quencher 2.0 g methanol

The resulting star polymer has a core to which is attached very approximately 25 arms. Each arm has a molecular weight of about 10,700 and consists of two blocks: a poly(methyl methacrylate) block of about 5500 molecular weight attached at one end to the core and a poly(2-ethyl-hexyl methacrylate) block of about 5200 molecular weight attached at one end to the other end of the poly(methyl methacrylate) block.

EXAMPLE 5

This describes the preparation of a star polymer having both poly(methyl methacrylate) arms and poly(2-ehtylhexylmethacrylate) arms on the same star polymer molecule.

The polymer can be used as a rheology control agent or toughening agent in coatings or plastics.

The poly(methyl methacrylate) arm polymer (a) and the poly(2-ethylhexyl methacrylate) arm polymer (b) were prepared simultaneously in separate reaction flasks and, without quenching, were mixed together before preparing the star polymer (c).

A. POLY(METHYL METHACRYLATE) ARM POLYMER

A reaction vessel as described in Example 1 was purged with dry nitrogen and then charged with the following initial charge:

Initial Charge 50.26 g glyme
0.65 g xylene
0.55 g 1-trimethylsiloxy-1-isobutoxy-2-methylpropene To the initial charge was then added via syringe the initial catalyst:

Initial Catalyst 50 microliters of a 1.0 molar solution of tris(dimethylamino)-sulfonium bifluoride (TASHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) Addition Started | Addition Completed |
|---|---|---|---|
| I | 50 microliters of 1 M TASHF$_2$ and 1.0 g acetonitrile | 0 | 30 |
| II | 30.42 g methyl methacrylate | 0 | 20 |

At a clock time of 30 minutes a 1 portion (Sample A-1) of the reaction mixture was removed and quenched in methanol.

B. POLY(2-ETHYLHEXYL METHACRYLATE) ARM POLYMER

A reaction vessel as described in Example 1 was purged with dry nitrogen and then charged with the following initial charge:

Initial Charge 44.13 g glyme
0.52 g xylene 1.16 g 1-trimethylsiloxy-1-isobutoxy-2-methylpropene

Initial Catalyst 50 microliters of a1.0 molar solution of tris(dimethylamino) sulfonium bifluoride (TASHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 100 microliters of 1 M TASHF$_2$ and 1.0 g acetonitrile | 0 | 30 |
| II | 28.82 g 2-ethylhexyl methacrylate | 0 | 20 |

At a clock time of 30 minutes, a 1 g portion of the resulting solution was then removed and quenched in methanol (Sample B-1).

C. STAR POLYMER

A reaction vessel as described in Example 1 was purged with dry nitrogen and then charged with a mixture of the arm polymer solutions described in A and B. The initial charge is:

Initial Charge 81.97 g arm polymer solution A
69.61 g arm polymer solution B The initial charge was then stirred continuously under dry nitrogen while adding the feed compositions shown below at constant rates via syringe pumps. The feed compositions and the addition schedule were as follows:

| Feed | Feed Composition | Clock Time (Minutes) | |
|---|---|---|---|
| | | Addition Started | Addition Completed |
| I | 50 microliters of 1 M TASHF$_2$ and 1.0 g acetonitrile | 30 | 60 |
| II | 4.86 g ethylene glycol dimethacrylate | 30 | 40 |

At a clock time of 70 minutes, the reaction was quenched by the addition of quencher:

Quencher 2.0 g methanol.

A portion of the resulting star polymer solution (Sample C-1) was removed for testing.

Analysis of the sample by HPLC showed the following:

| Sample | Identification | Conversion of Monomer |
|---|---|---|
| A-1 | MMA arm polymer | 69.3% |
| B-1 | 2EHMA arm polymer | 98.4% |
| C-1 | Star Polymer | 99.75% (MMA) |
| | | 99.47% (2EHMA) |
| | | 98.9% (EGDMA) |

The resulting star polymer had the following composition by weight.

8% Core
49% MMA arms (Mn=12,000)
43% 2EHMA arms (Mn=5,500)

EXAMPLE 6

This describes the preparation of a star polymer having both poly(methyl methacrylate) arms and poly(2-ethylhexyl methacrylate) arms on the same star polymer molecule. In this case, the poly(methyl methacrylate) arem polymer is made first, then a star polymer is made from it, and finally poly(2-ethylhexyl methacrylate) arms are grown from the star polymer.

The polymer can be used as a rheology control agent or toughening agent in coating or plastics.

A reaction vessel as described in Example 1 was purged with dry nitrogen and then charged with the following initial charge:

Initial Charge 176.29 g glyme
2.09 g xylene
1.24 g 1-trimethylsiloxy-1-isobutoxy-2-methylpropene To the initial charge was then added via syringe the initial catalyst:

Initial Catalyst 50 microliters of a 1 molar solution of tetrabutylammonium bifluroide in glyme. The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 200 microliters 1 M TBAHF$_2$[2] and 2.0 g glyme | 0 | 90 |
| II | 62.22 g methyl methacrylate | 0 | 15 |
| III | 4.31 g ethylene glycol dimethacrylate | 30 | 40 |
| IV | 57.88 g 2-ethylhexyl methacrylate | 50 | 65 |

During the additions, the temperature gradually increased, reaching a maximum of 55° C. at 15 minutes.

At a clock time of 48 minutes a 1.5 g portion of the mixture (Sample 1) was removed and quenched in methanol.

At a clock time of 100 minutes, the reaction was quenched by the addition of quencher:

Quencher 2.0 g methanol

The resulting solution of star polymer had a solids content of 28.3% (vs. 40.72%) suggesting a conversion of about 70%. The star polymer has an approximate composition of 3.5% Core
49.9% MMA arms (Mn=11,000)
46.7% 2EHMA arms (Mn=10,000)

EXAMPLE 7

This describes the preparation of a poly(methyl methacrylate) star polymer having allyl functionality at the ends of the arms. In this case, the core is prepared first.

The polymer is useful as an additive for plastic sheeting, air-dry finishes, low bake finishes and poly(methyl methacrylate) sheet.

A reaction vessel as described in Example 1 was purged with dry nitrogen and then charged with the following initial charge:

Initial Charge 89.5 g glyme
1.07 g xylene 1.23 g 1-trimethylsiloxy-1-isobutoxy-2-methylpropene To the initial charge was then added via syringe the initial catalyst:

Initial Catalyst 50 microliters of a 1 molar solution of tris(dimethylamino)-sulfonium bifluoride (TASHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 4.47 g ethylene glycol dimethacrylate | 0 | 5 |
| II | 200 microliters 1.0 M TASHF$_2$ and 2.0 g acetonitrile | 0 | 60 |
| III | 61.06 g methyl methacrylate | 15 | 45 |
| IV | 0.84 g allyl methacrylate (AMA) | 55 | Instant |

During the additions, the temperature rose, reaching a maximum of 58° C. at 45 minutes.

At a clock time of 45 minutes a 1 g portion of the reaction mixture was removed (Sample 1) and quenched in methanol.

At a clock time of 70 minutes, the polymer was quenched by the addition of quencher:

Quencher 2.0 g methanol

A portion of the resulting star polymer solution was removed for testing (Sample 2).

Analysis by high pressure liquid chromatograph (HPLC) of Samples 1 and 2 gave the following conversions of monomers

| | % Conversion |
|---|---|
| Sample 1 | 94.4 (MMA) |
| | 96.5 (EGDMA) |
| Sample 2 | 93.5 (MMA) |
| | 28.3 (AMA) |

The star polymer thus prepared has the following approximate composition.
7% Core
93% MMA/AMA arms (Mn=11,000)

EXAMPLE 8

This describes the preparation of a poly(methyl methacrylate) star polymer having butylacrylate blocks at the ends of the arms. In this case, the core is prepared first.

The polymer is useful as an additive for plastic sheeting, air-dry finishes, low bake finishes and poly(methyl methacrylate) sheet.

A reaction vessel as described in Example 1 was purged with dry nitrogen and then charged with the following initial charge:

Initial Charge 699.6 g THF
5.0 g xylene
7.0 g 1-trimethylsiloxy-1-methoxy-2-methylpropene To the initial charge was then added via syringe the initial catalyst:

Initial Catalyst 50 microliters of a 1 molar solution of tris(dimethylamino)-sulfonium bifluoride (TASHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 40.7 g hexane diol dimethacrylate | 0 | 10 |
| II | 400 microliters 1.0 M TBACB and 4.1 g THF | 0 | 90 |
| III | 199.5 g methyl methacrylate | 40 | 55 |
| IV | 255.8 g butylacrylate | 85 | Instantly |

During the additions, the temperature rose, reaching a maximum of 58° C. at 45 minutes.

At a clock time of 45 minutes a 1 g portion of the reaction mixture was removed (Sample 1) and quenched in methanol.

At a clock time of 120 minutes, the polymer was quenched by the addition of 10.0 g methanol.

EXAMPLE 9

This describes the preparation of a poly(2-ethylhexyl methacrylate) star polymer.

The polymer has a low glass transition temperature and is especially useful as an additive for improving the impact resistance of plastics or the toughness of coatings.

A reaction vessel as described in Example 1 was purged with nitrogen and then charged with the following initial charge:

Initial Charge 112.55 g glyme
1.4 g 1-trimethylsiloxy-1-isobutoxy-2-methylpropene To the initial charge was then added via syringe the initial catalyst:

Initial Catalyst 50 microliters of a 1.0 molar solution of tris(dimethylamino)-sulfonium bifluoride in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 200 microliters in TASHF$_2$ and 2.0 g acetonitrile | 0 | 60 |
| II | 4.85 g ethylene glycol dimethacrylate | 0 | 5 |
| III | 58.47 g 2-ethylhexyl methacrylate | 15 | 45 |

During the additions, the temperature rose, reaching a maximum of 41° C. at 50 minutes.

At a clock time of 70 minutes, the polymer was quenched by the addition of quencher.

Quencher 2.0 g methanol

The resulting solution of star polymer contains 36.7% solids (vs 35.44% theoretical). The star polymer consists of about 8% core and about 92% arm, the arms being poly(2-ethylhexyl methacrylate) having a number average molecular weight of about 9000.

EXAMPLE 10, DISPERSION OF A LARGE CORE STAR

This describes the preparation of a dispersion of a star polymer by conducting the polymerization in hexane. The relatively large core is a copolymer of methyl methacrylate and ethylene glycol dimethacrylate.

A reaction vessel as described in Example 1 was purged with nitrogen and then charged with the following initial charge:

Initial Charge 72.0 g hexane
17.4 g tetrahydrofuran
1.27 g 1-trimethylsiloxy-1-isobutoxy-2-methylpropene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 200 microliters of 1 M TBAHF$_2$ | 0 | 80 |
| II | 23.1 g 2-ethylhexyl methacrylate | 0 | 15 |
| III | 14.15 g methyl methacrylate | 30 | 40 |
| IV | 24.0 g methyl methacrylate and 4.42 g ethylene glycol dimethacrylate | 50 | 65 |

At 90 minutes, the reaction was quenched by the addition of quencher:

Quencher 2.0 g methanol

The resulting composition was a dispersion in hexane of a star polymer consisting of a core to which many arms are attached. The core accounts for 43% by weight of the star polymer and is a crosslinked copolymer of 16% by weight ethylene glycol dimethacrylate and 84% methyl methacrylate. The arms account for 57% by weight of the copolymer. Each arm is a block copolymer consisting of 1 block of poly(2-ethylhexyl methacrylate) having a number average molecular weight of about 4080 and 1 block of poly(methyl methacrylate) having a number average molecular weight of about 2410. The poly(methyl methacrylate) block has one end attached to the core. The poly(2-ethylhexyl methacrylate) block is free at one end and has the other end attached to the outboard end of the poly(methyl methacrylate) block.

EXAMPLE 11, DISPERSION OF A SMALL CORE STAR

This describes the preparation of a dispersion of a star polymer by conducting the polymerization in hexane. In this case, the core is smaller than that obtained in Example 10.

A reaction vessel as described in Example 1 was purged with nitrogen and then charged with the following initial charge:

Initial Charge 72.3 g hexane
18.2 g tetrahydrofuran
1.24 g 1-trimethylsiloxy-1-isobutoxy-2-methylpropene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 200 microliters of 1 M TBAHF$_2$ and 2.24 g tetrahydrofuran | 0 | 90 |
| II | 30.7 g 2-ethylhexyl methacrylate | 0 | 15 |
| III | 32.4 g methyl methacrylate | 30 | 45 |
| IV | 4.1 g ethylene glycol dimethacrylate | 55 | 70 |

At 100 minutes, the reaction was quenched 15 by the addition of quencher:

Quencher 2.0 g methanol

The resulting composition was a dispersion in hexane of a star polymer consisting of a core to which many arms are attached. The core, which was made from ethylene glycol dimethacrylate, accounted for 6.1% by weight of the star polymer. The arms accounted for 93.9% by weight of the star polymers. Each arm was a block copolymer consisting of 1 block of poly(2-ethylhexyl methacrylate) having a number average molecular weight of about 5500 and 1 block of poly(methyl methacrylate) having a number average molecular weight of about 5650. The poly(methyl methacrylate) block has one end attached to the core. The poly(2-ethylhexyl methacrylate) block is free at one end and has the other end attached to the outboard end of the poly(methyl methacrylate) block.

COMPARATIVE TEST A, GELLED GTP BATCH

This example shows that a simultaneous addition (as opposed to sequential addition in the other examples) of monomethacrylate and dimethacrylate produced a gel rather than the desired star polymer.

A reaction vessel as described in Example 1 was purged with nitrogen and then charged with the following initial charge:

Initial Charge 88.74 g glyme
1.25 g 1-trimethylsiloxy-1-isobutoxy-2-methylpropene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and the intended addition schedules were as follows:

| Feed | Feed Composition | Clock Time (Minutes) | |
|---|---|---|---|
| | | Addition Started | Addition Completed |
| I | 100 microliters of 1 M TBASF$_2$ in 2.0 g glyme | 0 | 45 |
| II | 60.0 g methyl methacrylate and 4.6 ethylene glycol dimethacrylate | 0 | 30 |

At a clock time of about 15 minutes, the reaction solution gelled. At the time of gellation, the mole ratio of the components which had been added was 1:2:52 of initiator: dimethacrylate: monomethacrylate.

COMPARATIVE TEST B, FREE RADICAL CONTROL

This shows that a mixture of monomethacrylate and dimethacrylate gels when polymerized by a free radical process.

A reaction vessel was charged with the following initial charge:

Initial Charge 25.0 g toluene

The initial charge was heated to reflux and then held at reflux and stirred continuously while adding the feed composition shown below at constant rate via a syringe pump. The feed composition and addition schedule were as follows:

| Feed | Feed Composition | Clock Time (Minutes) | |
|---|---|---|---|
| | | Addition Started | Addition Completed |
| I | 25.0 g methyl methacrylate 1.4 g ethylene glycol dimethacrylate 0.25 g Vazo ® 67 | 0 | 60 |

At a clock time of about 30 minutes, the reaction solution gelled. At the time of gellation, the mole ratio of the added reactants was 1:5.4:192 of initiator: dimethacrylate: monomethacrylate.

EXAMPLE 12, LIGHTLY CROSSLINKED CORE

This describes the preparation of a star polymer having a core which is not as highly crosslinked as those in other examples. The core is made first in this example.

A reaction vessel as described in Example 1 was purged with nitrogen and then charged with the following initial charge:

Initial Charge 86.4 g glyme
1.21 g 1-trimethylsiloxy-1-isobutoxy-2-methylpropene To the initial charge was then added via syringe the initial catalyst:

Initial Catalyst 50 microliters of a 1 molar solution of tetrabutylammonium bifluoride (TBAHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) | |
|---|---|---|---|
| | | Addition Started | Addition Completed |
| I | 200 microliters 1 M IBAHF$_2$ and 2.0 g glyme | 0 | 80 |
| II | 4.09 g ethylene glycol dimethacrylate and 2.54 g methyl methacrylate | 0 | 15 |
| III | 58.93 g methyl methacrylate | 30 | 60 |

At 90 minutes, the reaction was quenched 30 by the addition of quencher:

Quencher 2.0 g methanol

The resulting star polymer consists of about 11% by weight core and about 89% by weight arms. The core, having been made from a ratio of about 62% by weight ethylene glycol dimethacrylate and about 38% by weight methyl methacrylate is not as highly crosslinked as cores made from ethylene glycol dimethacrylate alone.

EXAMPLE 13, LIGHTLY CROSSLINKED CORE, ARM FIRST

This describes the preparation of a star polymer having a core which is not as highly crosslinked as those in other examples. In this case, the arm polymer is made first.

A reaction vessel as described in Example 1 was purged with nitrogen and then charged with the following initial charge:

Initial Charge 91.07 g glyme
1.2 g 1-trimethylsiloxy-1-isobutoxy-2-methylpropene To the initial charge was then added via syringe the initial catalyst:

Initial Catalyst 50 microliters of a 1.0 molar solution of tetrabutylammonium bifluoride (TBAHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) Addition Started | Addition Completed |
|---|---|---|---|
| I | 200 microliters 1.0 M TBAHF$_2$ and 2.0 g glyme | 0 | 80 |
| II | 63.98 g methyl methacrylate | 0 | 30 |
| III | 4.4 g ethylene glycol dimethacrylate and 6.6 g methyl methacrylate | 45 | 60 |

At 90 minutes, the reaction was quenched by the addition of quencher:

Quencher 2.0 g methanol

The resulting star polymer consisted of about 85.5% by weight of arm polymer and about 14.5% by weight of core. The core, having been made from a 40:60 weight ratio of dimethacrylate to monomethacrylate was not as tightly crosslinked as cores made from ethylene glycol dimethacrylate alone. The arms consisted of polymethyl methacrylate having a number average molecular weight of about 11,700.

EXAMPLE 14, STAR POLYMER HAVING TWO KINDS OF ARMS WITH AND WITHOUT GMA

This describes the preparation of a star polymer having two kinds of arms. One kind of arm is polymethyl methacrylate; the other kind is polymethyl methacrylate capped with a block of polyglycidyl methacrylate.

A reaction vessel as described in Example 1 was purged with nitrogen and then charged with the following initial charge:

Initial Charge 187.7 g glyme
5.2 g xylene
1.4 g 1-trimethylsiloxy-1-isobutoxy-2-methylpropene To the initial charge was then added via syringe the initial catalyst:

Initial Catalyst 100 microliters of a 1.0 molar solution of tetrabutylammonium bilfuoride (TBAHF$_2$) in glyme.

The mixture thus obtained was then stirred continuously under dry nitrogen at 0° C. while adding the feed compositions shown below at constant rates via syringe pumps. The feed compositions and the addition schedules were as follows:

| Feed | Feed Composition | Clock Time (Minutes) Addition Started | Addition Completed |
|---|---|---|---|
| I | 400 microliters of 1.0 M TBAHF$_2$ and 6.17 glyme | 0 | 100 |
| II | 39.89 g methyl methacrylate | 0 | 10 |
| III | 6.92 g ethylene glycol dimethacrylate | 20 | 35 |
| IV | 78.58 g methyl methacrylate | 50 | 70 |
| V | 3.9 g glycidyl methacrylate | 83 | 83 |

(Feed V was added in one shot at a clock time of 83 minutes. At a clock time of 115 minutes, the reaction was quenched by the addition of quencher)

Quencher 3.0 g methanol

The resulting star polymer consists of about 5.3% by weight of core to which were attached about 31.3% by weight of polymethyl methacrylate arms and about 53.4% by weight of block copolymer arms. The polymethyl methacrylate arms had a number average molecular weight of about 6300. The block copolymer arms had a number average molecular weight of about 12,700 and consists of a polymethyl methacrylate block having a number average molecular weight of about 12,100 and a polyglycidyl methacrylate block having a number average molecular weight of about 600. The polymethyl methacrylate block of each block copolymer arm was attached to the core and the polyglycidyl methacrylate block (which consisted of about 4 monomer units of glycidyl methacrylate) was attached to the outboard end of the polymethyl methacrylate block. On a number basis, 50% of the arms had no glycidyl group and the other 50% of the arms had 4 glycidyl groups each at their outer ends.

EXAMPLE 15, STAR POLYMER WITH 2 KINDS OF ARMS

This describes the preparation of a star polymer with two different kinds of arms.

A reaction vessel as described in Example 1 was purged with nitrogen and then charged with the following initial charge:

Initial Charge 183.3 g glyme
1.96 g xylene
1.31 g 1-trimethylsiloxy-1-isobutoxy-2-methylpropene To the initial charge was then added via syringe the initial catalyst:

Initial Catalyst 50 microliters of a 1.0 molar solution of tetrabutylammonium bifluoride (TBAHF$_2$) in glyme.

The mixture thus obtained was then stirred continuously under dry nitrogen while adding the feed compositions shown below at constant rates via syringe pumps. The feed compositions and the addition schedules were as follows:

| Feed | Feed Composition | Clock Time (Minutes) Addition Started | Addition Completed |
|---|---|---|---|
| I | 300 microliters 1.0 M TBAH$_2$ and 4.58 g glyme | 0 | 90 |
| II | 27.77 g 2-ethylhexyl methacrylate | 0 | 10 |
| III | 5.32 g ethylene glycol dimethacrylate | 25 | 40 |

| Feed | Feed Composition | Clock Time (Minutes) Addition Started | Addition Completed |
|---|---|---|---|
| IV | 88.54 g methyl methacrylate | 50 | 70 |

At a clock time of 100 minutes, the reaction mixture was quenched by the addition of quencher:

Quencher 2.0 g methanol

The resulting star polymer consisted of a core to which many arms were attached. The composition was:
4.3% core of EGDMA
23.4% ZEHMA arm (Mn=4,700)
72.3% MMA arm (Mn=14,600)

EXAMPLE 16

A reaction vessel as described in Example 1 was purged with nitrogen and then charged with the following initial charge:

Initial Charge 179.37 g glyme
4.85 g 1-trimethylsiloxy-1-isobutoxy-2-methylpropene
2.4 g xylene To the initial charge was then added via syringe the initial catalyst:

Initial Catalyst 50 microlieters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and addition schedules were as follows:

| Feed | Feed Composition | Clock Time (Minutes) Addition Started | Addition Completed |
|---|---|---|---|
| I | 300 microliters of 1.0 M TBAHF$_2$ and 3.0 g glyme | 0 | 80 |
| II | 133.04 g methyl methacrylate | 0 | 30 |
| III | 13.55 g ethylene dimethacrylate | 45 | 60 |

At a clock time of 45 minutes, a 101.28 g sample was removed for analysis and quenched by the addition of 2.0 g methanol.

At a clock time of 95 minutes, 2 g methanol was added.

EXAMPLE 17

A reaction vessel as described in Example 1 was purged with nitrogen and then charged with the following initial charge:

Initial Charge 178.32 g glyme
2.34 g 1-trimethylsiloxy-isobutoxy-2-methylpropene
1.72 g xylene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and addition schedules were as follows:

| Feed | Feed Composition | Clock Time (Minutes) Addition Started | Addition Completed |
|---|---|---|---|
| I | 300 microliters of 1.0 M TBAHF$_2$ and 3.0 g glyme | 0 | 80 |
| II | 128.39 g methyl methacrylate | 0 | 30 |
| III | 6.85 g ethylene dimethacrylate | 45 | 60 |

At a clock time of 45 minutes, a 94.09 g sample was removed for analysis and quenched by the addition of 2.0 g methanol.

At a clock time of 95 minutes, 2 g methanol was added.

An additional advantage of making star polymers by group transfer polymerization is that it gives good molecular weight control of both the arm and the star. That is, narrow molecular weight dispersities are obtained when these components are measured by Gel Permeation Chromatography. For example, the process of this Example 16 would typically give arms that would have a MN=11,900; MW=18,000; and D (MW/MN)=1.51 when measured by GPC. The star made from these arms would have a MN=312,000; MW=455,000; and D=1.46. This is in contrast to previous attempts to make methacrylate stars. Zilliox (J. Zillox. P. Rempp, and J. Parrod, J. Polymer Science: Part C, Polymer Symposia No. 22, pp 145-156 (1968)) reported that the methacrylate star he made by anionic polymerization is polydispersed because the number of branches (attached arms) fluctuates appreciably.

EXAMPLE 18

A reaction vessel as described in Example 1 was purged with nitrogen and then charged with the following initial charge:

Initial Charge 181.43 g glyme
4.55 g 1-trimethylsiloxy-1-isobutoxy-2-methylpropene
2.23 g xylene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and addition schedules were as follows:

| Feed | Feed Composition | Clock Time (Minutes) | |
|---|---|---|---|
| | | Addition Started | Addition Completed |
| I | 300 microliters of 1.0 M TBAHF$_2$ and 3.0 g glyme | 0 | 80 |
| II | 13.99 g ethylene dimethacrylate | 30 | 60 |
| III | 83.63 g methyl methacrylate | 61 | 71 |

At a clock time of 130 minutes, 2 g methanol was added to quench the living polymer.

EXAMPLE 19

This describes a preferred procedure for the polymerization of methyl methacrylate using an oxyanion catalyst and acetonitrile as a solvent and a catalyst longevity enhancer.

A reaction vessel as described in Example 1 was purged with nitrogen and then charged with the following initial charge:

Initial Charge 110.0 g THF
1.0 g 1-trimethylsiloxy-1-methoxy-2-methylpropene
1.0 g xylene To the initial charge was then added via syringe the initial catalyst:

Initial Catalyst 50 microliters of a 1.0 molar solution of tetrabutylammonium m-chloroacetate in acetonitrile.

The mixture thus obtained was then stirred continuously under dry nitrogen while adding the feed compositions shown below at constant rates via syringe pumps. The feed compositions and addition schedules were as follows:

| Feed | Feed Composition | Clock Time (Minutes) | |
|---|---|---|---|
| | | Addition Started | Addition Completed |
| I | 50 microliters of 1.0 M TBACB and 3.0 g acetonitrile | 0 | 80 |
| II | 62.9 g methyl methacrylate | 0 | 30 |
| III | 7.0 g ethylene dimethacrylate | 61 | 71 |

At a clock time of 30 minutes, a 34.20 g sample was removed for analysis and quenched by the addition of 2.0 g methanol.

At a clock time of 130 minutes, 2 g methanol was added to quench the living polymer.

EXAMPLE 20

A reaction vessel as described in Example 1 was purged with nitrogen and then charged with the following initial charge:

Initial Charge 178.33 g glyme
2.48 g 1-trimethylsiloxy-1-isobutoxy-2-methylpropene
2.00 g xylene To the initial charge was then added via syringe the initial catalyst:

Initial Catalyst 50 microliters of a 1.0 molar solution of tetrabutylammonium bifluoride in glyme.

The mixture thus obtained was then stirred continuously under dry nitrogen while adding the feed compositions shown below at constant rates via syringe pumps. The feed compositions and addition schedules were as follows:

| Feed | Feed Composition | Clock Time (Minutes) | |
|---|---|---|---|
| | | Addition Started | Addition Completed |
| I | 300 microliters of 1.0 M TBAHF$_2$ and 3.0 g glyme | 0 | 80 |
| II | 8.77 g ethylene dimethacrylate | 0 | 15 |
| III | 83.92 g methyl methacrylate | 30 | 60 |

At a clock time of 30 minutes, a 30.04 g sample was removed for analysis and quenched by the addition of 2.0 g methanol.

At a clock time of 100 minutes, 2 g methanol was added.

EXAMPLE 21

A reaction vessel as described in Example 1 was purged with nitrogen and then charged with the following initial charge:

Initial Charge 184.46 g glyme
1.14 g 1-trimethylsiloxy-1-isobutoxy-2-methylpropene
2.31 g xylene To the initial charge was then added via syringe the initial catalyst:

Initial Catalyst 50 microliters of a 1.0 molar solution of tetrabutylammonium bifluoride in glyme.

The mixture thus obtained was then stirred continuouly under dry nitrogen while adding the feed compositions shown below at constant rates via syringe pumps. The feed compositions and addition schedules were as follows:

| Feed | Feed Composition | Clock Time (Minutes) | |
|---|---|---|---|
| | | Addition Started | Addition Completed |
| I | 300 microliters of 1.0 M TBAHF$_2$ and 3.0 g glyme | 0 | 80 |
| II | 5.85 g ethylene dimethacrylate | 0 | 15 |
| III | 87.24 g methyl methacrylate | 30 | 60 |

At a clock time of 30 minutes, a 44.90 g sample was removed for analysis and quenched by the addition of 2.0 methanol.

At a clock time of 100 minutes, 2 g methanol was added.

EXAMPLE 22

A reaction vessel as described in Example 1 was purged with nitrogen and then charged with the following initial charge:

Initial Charge 182.0 g glyme
1.32 g 1-trimethylsiloxy-1-isobutyoxy-2-methylpropene
2.02 g xylene To the initial charge was then add via syringe the inital catalyst.

Initial Catalyst 50 microliters of a 1.0 molar solution of tetrabutylammonium bifluoride in glyme.

The mixture thus obtained was then stirred continuously under dry nitrogen while adding the feed composition shown below at constant rates via syringe pumps. The feed compositions and addition schedules were as follows:

| Feed | Feed Composition | Clock Time (Minutes) Addition Started | Addition Completed |
|---|---|---|---|
| I | 300 microliters of 1.0 M TBAHF$_2$ and 3.0 g glyme | 0 | 80 |
| II | 119.1 g methyl methacrylate | 0 | 30 |
| III | 3.15 g ethylene dimethacrylate | 45 | 60 |

At a clock time of 45 minutes, a 75.0 g sample was removed for analysis and quenched by the addition of 2.0 g methanol.

At a clock time of 95 minutes, 2 g methanol was added.

ANALYTICAL CHARACTERIZATION OF STAR POLYMERS EXAMPLES 12-13, 16-18 AND 20-22

Some of the star polymers described above were characterized by quasielastic laser light scattering (QUELS) and by intrinsic viscosity. The "QELS" technique is described by F. B. Malihi, T. Provder and M. E. Kohler, Journal of Coatings Technology, vol. 55, No. 702, pp. 41-48 (July, 1983) and B. J. Berne and R. Pecora, "Dynamic Light Scattering", John Wiley & Sons, New York (1976), measurement of intrinsic viscosity" is described by J. F. Rabek, "Experimental Methods in Polymer Chemistry", John Wiley & Sons, New York (1980), pp 125-128 and by W. R. Sorenson and T. W. Campbell, "Preparative Methods of Polymer Chemistry", Second Edition, Interscience Publishers, New York (1968), pp. 44-50.

The molecular weights of the star polymers were calculated from the hydrodynamic radius, $R_H$, obtained by the "QELS" technique and from the intrinsic viscosity, $[\eta]$, according to the following equation:

$$M = \frac{10 \pi N_A R_H^3}{3 [\eta]}$$

where
 M = molecular weight of the star polymer
 $N_1$ = Avogadro's constant = $6.023 \times 10^{23}$ mol$^{-1}$
 $R_H$ = hydrodynamic radius from "QELS"
 $[\eta]$ = intrinsic viscosity
All measurements were made in methyl ethyl ketone.

The number of arms for star polymer molecule was calculated by dividing the molecular weight of the star polymer by the weight average molecular weight (as determined by GPC) of the arm polymer. Although this calculation is strictly valid only when the star molecule is in solution and the hydrodynamic diameter is less than 600 angstroms, the calculations were also done for the larger stars for comparison.

The results are shown below in Table I.

TABLE 1

| Star Polymer of Example | Intrinsic Viscosity (ml/g) | $D_H$ (Å) | Molecular Weight $M_w$ of Stars | Number of Arms | Arms per Star |
|---|---|---|---|---|---|
| 12 | 19.68 | 1214 | $7.17 \times 10^7$ | 16,600 | 4320 |
| 13 | 14.72 | 227 | $6.26 \times 10^5$ | 16,600 | 38 |
| 16 | 23.87 | 1000 | $3.31 \times 10^7$ | 8,035 | 4120 |
| 17 | 14.89 | 387 | $3.07 \times 10^6$ | 16,600 | 185 |
| 18 | 11.37 | 4380 | $5.83 \times 10^9$ | 8,035 | $7.26 \times 10^5$ |
| 20 | 20.37 | 3600 | $1.81 \times 10^9$ | 16,600 | $1.09 \times 10^5$ |
| 21 | 21.44 | 2900 | $1.55 \times 10^9$ | 27,900 | $5.56 \times 10^4$ |
| 22 | 20.91 | 155 | $4.29 \times 10^5$ | 27,900 | 15 |

These results show that this invention provides acrylic star polymers that can be designed to have any of a wide range of molecular sizes, lengths of arms and numbers of arms per molecule.

EXAMPLE 23

The following example shows the use of star polymers in coatings.

The following compositions are prepared and then blended together to form a high solids white enamel.

| | |
|---|---|
| Acrylic Polymer Solution (a polymer of styrene/methyl methacrylate/butyl acrylate/hydroxyethyl acrylate 15/15/40/30 prepared at 75% solids in methyl amyl ketone using conventional free radical techniques) | 80.0 |
| Star Polymer (described in Example 18) | 25.0 |
| White Millbase (a standard millbase composed of 70% white pigment, 10% acrylic polymer [from acrylic polymer solution described above], and 20% methyl amyl ketone | |
| Melamine Resin | 30.0 |
| P-toluene Sulfonic Acid Solution (17.7% P-toluene sulfonic acid, 12.5% dimethyl oxazolidine, and 69.8% methanol) | 2.8 |
| Xylene | 40.0 |
| Methyl Amyl Ketone | 22.2 |
| Total | 200.0 |

The above composition was sprayed onto a steel panel primed with an alkyd primer and baked for 30 minutes at about 120° C. to give a glossy, hard finish with a good appearance. The finish was resistant to weathering, solvents, scratches and has excellent chip resistance. The above properties show that the coating composition is useful for finishing cars and trucks.

The above composition when sprayed and baked did not sag. Controls that had no star polymer produced sag when placed in the baking oven. This shows that the star polymers are useful in coatings.

EXAMPLE 24

This describes the use of star polymers as tougheners for plastic sheeting.

Dried star polymer (20.0 g), as prepared in Example 2 was dissolved in 75.0 g of methyl methacrylate by heating to 55° C. for about 30 minutes. This solution was cooled to room temperature, and 5.0 g of a solution of 50.0 g methyl methacrylate, 0.8 g of Lupersol 11 peroxide catalyst from Lucidol, and 0.080 g of Vazo 64 azobisisobutyronitrile polymerization catalyst from Du Pont were added. The resulting water white solution was degassed using an aspirator for 15 minutes.

The resulting solution was poured into a thermocoupled mold made from 6.35 cm squares of 0.635 cm safety glass, held apart by a 0.317 cm gasket. The mold was immersed into an 80° C. water bath, and held 1 hour. At 51 minutes a maximum mold temperature of 92.2° C. was recorded.

When the mold was removed it was placed in a 120° C. oven for 30 minutes, then removed and cooled to room temperature.

The resultant casting was a clear strong sheet. This was cut into 2" squares and tested for impact strength using an instrumented impact tester with a Gardner-test geometry. Crack initiation energy for four samples was determined to be 0.28±0.04 joules. Control samples made without the star polymer gave a result of 0.23±0.01 joules, while commercial clear poly(methyl methacrylate) sheet gave 0.17±0.06 joules.

These results show that the addition of a star polymer increased the strength of a plastic part.

Industrial Applicability

In addition to the uses of star polymers of the invention in coatings and as tougheners for plastic sheeting and in the other applications indicated above, such star polymers have many other potential uses, as do other products made by group transfer polymerization. These can include cast, blown, spun or sprayed applications in fiber, film, sheet, composite materials, multilayer coatings, photopolymerizable materials, photoresists, surface active agents including soil repellants and physiologically active surfaces, adhesives, adhesion promoters and coupling agents, among others. Uses include as dispersing agents, rheology control additives, heat distortion temperature modifiers, impact modifiers, reinforcing additives, stiffening modifiers and applications which also take advantage of narrow molecular weight and low bimodal polydispersity. End products taking adavantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboards and traffic control devices, reprographic products, and many others.

I claim:

1. An arm/core process for preparing acrylic star polymers which comprise
   a. a crosslinked core comprising a polymer derived from a mixture of monomers (A) comprising
      i. 1-100% by weight of one or more monomers each having at least two groups.

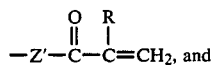

ii. 0-99% by weight of one or more monomers, each having one group,

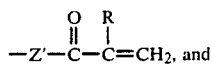

b. attached to the core, at least 5 arms comprising polymer chains derived from one or more monomers (B), each having one group,

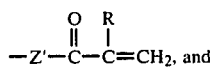

in each of which R is the same or different and is H, $CH_3C_3CH_2$, CN or $CO_2R'$ and Z' is O or NR', wherein R' is $C_{1-4}$ alkyl, and
   c. attached to the core or to at least some of the arms, living group transfer polymerization sites which are $(R^1)_3M$ wherein; R is selected from the group consisting of $C_{1-10}$ alkyl and $C_{6-10}$ aryl or alkaryl; and M is Si, Sn, or Ge, said process comprising group transfer polymerization utilizing a tetracoordinate organosilicon, organotin or organogermanium polymerization initiator having at least one initiating site, and a catalyst suitable for group transfer polymerization, involving the sequential steps of a. preparing a living arm polymer by reacting the transfer initiator with one or more monomers (B), each having one group

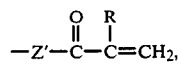

b. contacting the resulting living polymers in the presence of the catalyst with a mixture of monomers (A) comprising
      i. 1-100% by weight of one or more monomers each having at least two groups,

ii. 0-99% by weight of one or more monomers, each having one group,

2. A core/arm process for preparing acrylic star polymers which comprise
   a. a crosslinked core comprising a polymer derived from a mixture of monomers (A) comprising
      i. 1-100% by weight of one or more monomers, each having at least two groups.

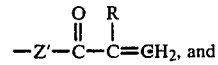

ii. 0-99% by weight of one or more monomers, each having one group,

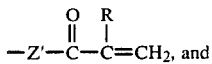

b. attached to the core, at least 5 arms comprising polymer chains derived from one or more monomers (B), each having one group,

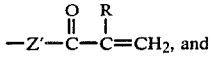

in each of which R is the same or different and is H, $CH_3$, $CH_3CH_2$, CN or $CO_2R'$ and Z' is O or NR', wherein R' is $C_{1-4}$ alkyl, and c. attached to the core or to at least some of the arms, living group transfer polymerization sites which are $(R^1)_3M$ wherein; R is selected from the group consisting of $C_{1-10}$ alkyl and $C_{6-10}$ aryl or alkaryl; and M is Si, Sn, or Ge, said process comprising group transfer polymerization utilizing a tetracoordinate organosilicon, organotin or organogermanium polymerization initiator having at least one initiating site, and a catalyst suitabe for group transfer polymerization, involving the sequential steps of a. preparing a living core polymer by reacting the transfer initiator in the presence of the catalyst with a mixture of monomers (A) comprising i. 1-100% by weight of one or more monomers, each having at least two groups,

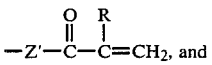

ii. 0-99% by weight of one or more monomers, each having one group,

b. contacting the resulting living core polymer in the presence of the catalyst with one or more monomers (B) each having one group,

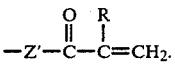

3. An arm/core/arm process for preparing acrylic star polymer which comprise a. a crosslinked core comprising a polymer derived from a mixture of monomers (A) comprising i. 1-100% by weight of one or more monomers, each having at least two groups.

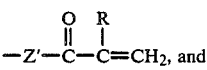

ii. 0-99% by weight of one or more monomers, each having one group,

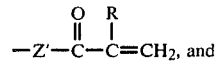

b. attached to the core, at least 5 arms comprising polymer chains derived from one or more monomers (B), each having one group,

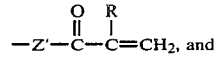

in each of which R is the same or different and is H, $CH_3$, $CH_3CH_2$, CN or $CO_2R'$ and Z' is O or NR', wherein R' is $C_{1-4}$ alkyl, and c. attached to the core or to at least some of the arms, living group transfer polymerization sites which are $(R^1)_3M$ wherein; R is selected from the group consisting of $C_{1-10}$ alkyl and $C_{6-10}$ aryl or alkaryl; and M is Si, Sn, or Ge, said process comprising group transfer polymerization utilizing a tetracoordinate organosilicon, organotin or organogermanium polymerization initiator having at least one initiating site, and a catalyst suitable for group transfer polymerization, involving the sequential steps of a. preparing a living arm polymer by reacting the transfer initiator with one or more monomers (B), each having one group

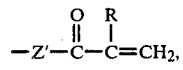

b. contacting the resulting living polymers in the presence of the catalyst with a mixture of monomer (A) comprising i. 1-100% by weight of one or more monomers (A), each having at least two groups,

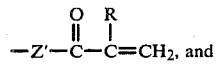

ii. 0-99% by weight of one or more monomers, each having one group,

c. contacting the resulting living star polymer with one or more monomers (C), each having one group

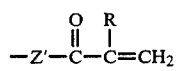

where the monomers (C) can be the same as or different from the monomers (A).

4. An arm/core process for preparing acrylic star polymers which comprise a. a crosslinked core comprising a polymer derived from a mixture of monomers (A) comprising i. 1-100% by weight of one or more monomers each having at least two groups,

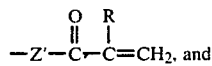

ii. 0-99% by weight of one or more monomers, each having one group,

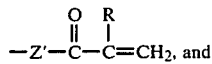

b. attached to the core, at least 5 arms comprising polymer chains derived from one or more monomers (B), each having one group,

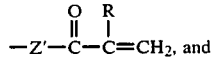

in each of which R is the same or different and H, $CH_3$, $CH_3CH_2$, CN or $CO_2R'$ and $Z'$ is Q or $NR'$, wherein $R'$ is $C_{1-4}$ alkyl, and c. attached to the core or to at least some of the arms, living group transfer polymerization sites which are $(R^1)_3M$ wherein; R is selected from the group consisting of $C_{1-10}$ alkyl and $C_{6-10}$ aryl or alkaryl; and M is Si, Sn, or Ge, said process comprising group transfer polymerization utilizing a tetracoordinate organosilicon, organotin or organogermanium polymerization initiator having at least one initiating site, and a catalyst suitable for group transfer polymerization, involving the sequential steps of a. preparing a living arm polymer by reacting the transfer initiator with one or more monomers (B), each having one group

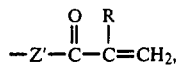

b. contacting the resulting living polymers in the presence of the catalyst with a mixture of monomers (A) comprising
i. 1-100% by weight of one or more monomers each having at least two groups,

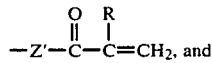

ii. 0-99% by weight of one or more monomers, each having one group,

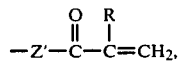

wherein the monomer of (a)(i) is methyl methacrylate, the monomers of (a) (ii) and (b) are ethylene glycol dimethacrylate, and the group transfer polymerization is conducted using 1-trimethylsiloxy-1-isobutoxy-2-methylpropene as the initiator and tetrabutyl ammonium bifluoride as the catalyst.

* * * * *